US012695288B2

(12) United States Patent
  Domejean et al.

(10) Patent No.: US 12,695,288 B2
(45) Date of Patent: Jul. 28, 2026

(54) ELECTRICAL PROTECTION DEVICE

(71) Applicant: Schneider Electric Industries SAS, Rueil Malmaison (FR)

(72) Inventors: Eric Domejean, Voreppe (FR); Emmanuel Frangin, Grenoble (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 115 days.

(21) Appl. No.: 18/751,539

(22) Filed: Jun. 24, 2024

(65) Prior Publication Data

US 2025/0007269 A1    Jan. 2, 2025

(30) Foreign Application Priority Data

Jun. 27, 2023    (FR) ...................................... 2306704

(51) Int. Cl.
  H02H 3/08     (2006.01)
  H02H 3/06     (2006.01)
  H02H 11/00    (2006.01)

(52) U.S. Cl.
  CPC .............. H02H 3/08 (2013.01); H02H 3/066 (2013.01); H02H 11/00 (2013.01)

(58) Field of Classification Search
  CPC ........... H02H 3/08; H02H 3/066; H02H 11/00
  See application file for complete search history.

(56) References Cited

U.S. PATENT DOCUMENTS 4,658,320  A  *  4/1987  Hongel .................. H01H 9/542
                                                             361/13
11,476,681 B2 * 10/2022  Hong ........................ H02J 7/52

2011/0102052 A1 *  5/2011  Billingsley ............ H01H 9/542
                                                             327/365
2012/0013200 A1 *  1/2012  Kroeker ............... H01H 50/543
                                                             307/115
2014/0009106 A1 *  1/2014  Andrea .................. H02H 9/002
                                                             320/126
2017/0372859 A1 * 12/2017  Gopa ..................... H01H 71/02
2019/0341213 A1   11/2019  Kouroussis et al.
2019/0363200 A1 * 11/2019  Höft ...................... H10F 77/955
2021/0066013 A1    3/2021  Kumar et al.

FOREIGN PATENT DOCUMENTS

FR         3123141  A1    11/2022

OTHER PUBLICATIONS

French Search Report and Written Opinion dated Dec. 18, 2023 for corresponding French Patent Application No. FR 2306704, 9 pages.

* cited by examiner

*Primary Examiner* — Scott Bauer
(74) *Attorney, Agent, or Firm* — Wolf, Greenfield & Sacks, P.C.

(57)                ABSTRACT

An electrical protection device including main electrical contacts, a switching mechanism, a solid-state power switch connected in series with the main electrical contacts, a safety device connected in parallel with the main electrical contacts, the safety device including secondary electrical contacts, and a control unit, the control unit being adapted to control the power switch and the switching mechanism. The safety device being adapted to, when a current of greater than a predetermined value flows through the safety device, activate the switching mechanism to switch the main electrical contacts and the secondary electrical contacts to the open state.

8 Claims, 15 Drawing Sheets

ELECTRICAL PROTECTION DEVICE

TECHNICAL FIELD

The present invention relates to the technical field of electrical protection devices and systems, such as electrical circuit breakers. More particularly, the invention relates to the technical field of electrical circuit breakers called "solid-state circuit breakers".

PRIOR ART

Many electrical switching devices of electromechanical type, such as air circuit breakers, and notably miniature circuit breakers (MCBs) generally comprise a quenching chamber. The quenching chamber is set up to extinguish an electric arc which occurs in the air between the electrical contacts of the device when the electrical contacts are separated after the device is tripped.

The quenching chamber typically comprises, in addition to at least one mobile part for opening the circuit, a stack of metal plates superposed one on top of the other so as to extend and extinguish the electric arc that may occur when the circuit is being opened.

However, in order to improve the performance of these electrical protection devices (hereinafter "protection device"), a proposal has been made to replace the quenching chamber with an electronic breaking device comprising power switches based on semiconductor components. Such circuit breakers are called "solid-state" circuit breakers.

French patent application FR3123141 published on 25 Nov. 2022 discloses such electrical protection devices.

The improved performance of these electrical protection devices is, for example, advantageous in direct-current (DC) electrical systems comprising batteries of electrochemical accumulators, the electrical protection devices for which must be capable, in the event of the occurrence of an electrical fault, of interrupting strong currents with a very rapid reaction time.

These solid-state electrical protection devices must be capable of interrupting the electrical current with at least as much reliability and safety as electromechanical protection devices. These reliability and safety requirements are defined in standards, for example the "UL 489i" standard governed by the Underwriters' Laboratories (UL) certification body.

This standard comprises requirements that must be met for solid-state moulded-case circuit breakers (SSCBs) or solid-state hybrid moulded-case circuit breakers (SSHCBs).

These requirements cover in 2023 circuit breakers having a nominal value ranging, for example, up to 1000 V for an alternating current and 1500 V for a direct current which switch by using semi-conductors. These protection devices are intended, for example, to protect the service entrances, the power supply lines and the branch circuits. These devices may require an auxiliary control power supply.

This standard defines that a circuit breaker must be capable of cutting off a current of equal to six times the nominal current when closing and opening in the event of a fault of the breaking electronics.

The object of the present invention is to propose an electrical protection device comprising a switching mechanism in the event of a fault of the breaking electronics.

SUMMARY OF THE INVENTION

The above-mentioned objectives are, at least in part, achieved by an electrical protection device comprising two connection terminals, main electrical contacts, separable and connected between the two connection terminals, the main electrical contacts being switchable between an open state, in which the electrical contacts are separated, and a closed state, in which the electrical contacts are in contact, a switching mechanism, the switching mechanism being adapted to switch the main electrical contacts to the open state, a solid-state power switch connected in series with the main electrical contacts, the power switch being adapted to shift between an open state, blocking the passage of the current, and a closed state, allowing the current to pass through, and a safety device connected in parallel with the main electrical contacts. The safety device comprises secondary electrical contacts, the secondary electrical contacts being separable and movable between an open state and a closed state. The switching mechanism is adapted to switch the secondary electrical contacts to the open state. The electrical protection device comprises a control unit, the control unit being adapted to shift the electrical protection device between an open state, in which the power switch, the main electrical contacts and the secondary electrical contacts are in an open state, and a closed state, in which the power switch, the main electrical contacts and the secondary electrical contacts are in a closed state. The control unit is adapted to control the power switch and the switching mechanism, and to, when the electrical protection device is being closed, close the secondary electrical contacts of the safety device before the main electrical contacts and the power switch, and, when the electrical protection device is being opened, open the main electrical contacts and the power switch before opening the secondary electrical contacts of the safety device. The safety device is adapted to, when a current of greater than a predetermined value flows through said safety device, activate the switching mechanism to switch the main electrical contacts and the secondary electrical contacts to the open state.

Advantageously, the electrical protection device is protected against a possible fault of the power switch which would allow a current to pass through despite the fact that the current switch is supposed to be in an open state.

Specifically, when the electrical protection device is being closed—when the electrical protection device passes from an open state to a closed state—the secondary electrical contacts of the safety device are closed first. Assuming that the power switch, although in the open state, would despite everything allow a current to pass through, the safety device then activates the switching mechanism to immediately open the main electrical contacts and the secondary electrical contacts, possibly in the process of closing, thus interrupting the current in the electrical protection device.

Similarly, when the electrical protection device is being opened—when the electrical protection device passes from a closed state to an open state—the secondary electrical contacts of the safety device are opened last. Assuming that the power switch, although switched into the open state, would despite everything still allow a current to pass through, the safety device then activates the switching mechanism to immediately open the main electrical contacts and the secondary electrical contacts, thus interrupting the current in the electrical protection device.

According to one embodiment of the invention, the safety device comprises a first striker adapted to, when the current of greater than a predetermined value flows through said safety device, activate the switching mechanism to switch the main electrical contacts and the secondary electrical contacts to the open state.

Advantageously, the possible current passing through the striker makes it possible to trip said striker and to activate the switching mechanism.

According to one embodiment of the invention, the switching mechanism being adapted to switch the separable main electrical contacts and the separable secondary electrical contacts to the open state and to the closed state, the safety device is further adapted to, when the current of greater than a predetermined value flows through said safety device, and after having activated the switching mechanism to switch the separable main electrical contacts and the separable secondary electrical contacts to the open state: block the switching mechanism to prevent the main electrical contacts and secondary electrical contacts from switching to the closed state.

Advantageously, in the event of tripping after a possible fault of the power switch, the safety device then blocks any possibility of closing the separable main electrical contacts and secondary electrical contacts, making the electrical protection device safe.

According to one embodiment of the invention, the first striker comprises a blocking element adapted to keep the switching mechanism blocked once the striker is struck.

Advantageously, the striker, once tripped, is blocked in its tripped position, this making it possible to keep the switching mechanism blocked, thus preventing any possibility of closing the separable main electrical contacts and secondary electrical contacts.

According to one embodiment of the invention, the safety device further comprises a current limiting element connected in series with the secondary electrical contacts.

Advantageously, if an electric arc forms when the secondary electrical contacts are being opened, the current limiting element makes it possible to reduce the intensity of the current passing through the safety device and thus to quench the electric arc between the secondary electrical contacts in the open position. This is particularly advantageous for a direct current and/or high voltage (for example, for a voltage greater than 750 Vdc).

According to one embodiment of the invention, the current limiting element connected in series with the secondary electrical contacts is a fuse.

Advantageously, the fuse makes it possible to cut off the current in the safety device permanently depending on the size of the fuse.

According to one embodiment of the invention, the safety device further comprises a mobile screen, the mobile screen being made of an electrically insulating material and adapted to be moved between a first position and a second position, the mobile screen being placed in the first position by default and being placed between the main electrical contacts to prevent contact between the main electrical contacts in the second position. The safety device comprises a second striker, the second striker being adapted to, when the current of greater than a predetermined value flows through said safety device, move the mobile screen into the second position.

Advantageously, in the event of a possible fault of the power switch, an insulating screen is put in place, physically preventing any closing of the main electrical contacts. Thus, in combination with the presence of a fuse—effectively cutting off the safety device—, this feature prevents any closing of the main electrical contacts and makes the cutting off of the current for the protection device independent of any possible action of the switching mechanism.

According to one embodiment of the invention, the first striker and the second striker are one and the same striker.

Advantageously, the architecture of the protection device is simplified and made more compact by the use of one and the same striker to activate the switching mechanism and place the insulating screen between the main contacts.

BRIEF DESCRIPTION OF THE FIGURES

Other features and advantages of embodiments of the electrical protection device according to the invention will become apparent in the following description, given by way of non-limiting examples, with reference to the appended figures in which.

DETAILED DESCRIPTION OF CERTAIN EMBODIMENTS

Figure 1:
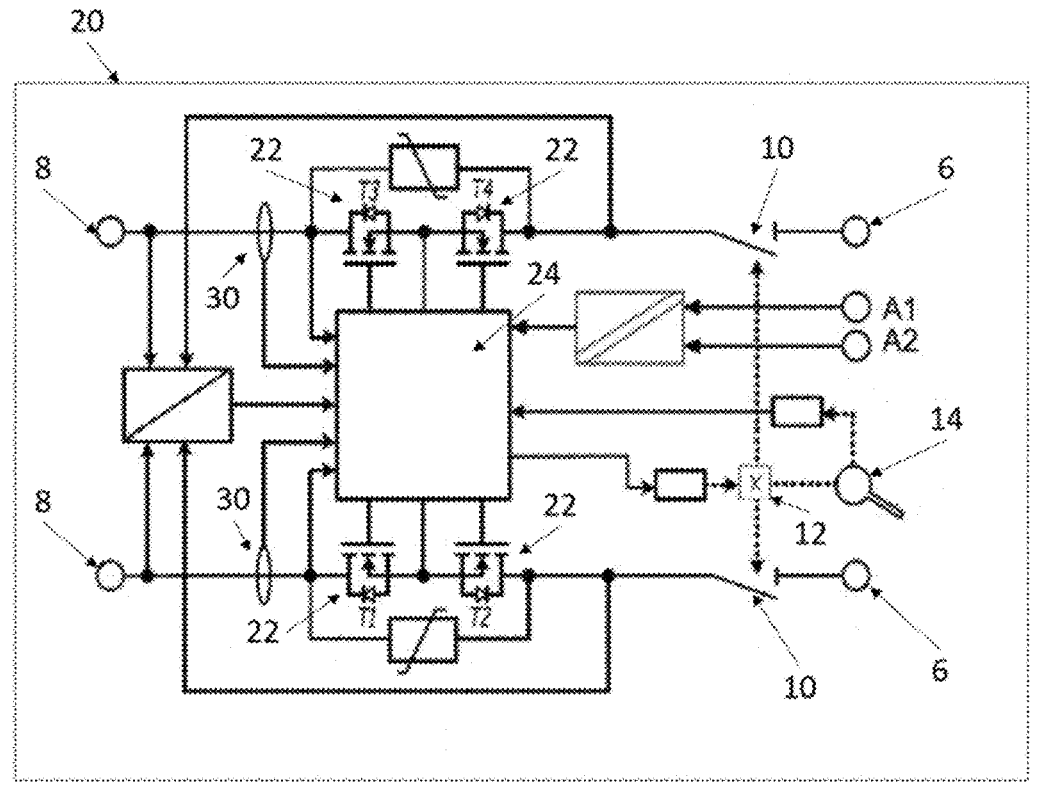
FIG. 1 illustrates a protection device according to the prior art such as disclosed in French patent application FR3123141 published on 25 Nov. 2022.

FIG. 1 illustrates a protection device 20 according to the prior art such as disclosed in French patent application FR3123141 published on 25 Nov. 2022. FIG. 1 corresponds to FIG. 2 of patent application FR3123141 modified to remove the unnecessary references. A detailed description of this protection device 20 is given in document FR3123141, particularly from paragraph [0032] and up to paragraph [0097] of document FR3123141. The operating mode of the protection device 20 is detailed from paragraph [0098] of document FR3123141. The references used in the description of FIG. 1 correspond to the references used in document FR3123141.

The protection device 20 illustrated in FIG. 1 comprises two pairs of connection terminals 6 and 8: a first input terminal 6 connected to a first output terminal 8 via a first connection line (at the top of FIG. 1), and a second input terminal 6 connected to a second output terminal 8 via a second connection line (at the bottom of FIG. 1).

The protection device 20 illustrated in FIG. 1 comprises separable electrical contacts 10 connected between the connection terminals 6 and 8, and a switching mechanism 12 comprising a control member 14 (also called a control stick or operating lever below). The operating lever 14 is, for example, a pivoting lever which can be accessed from outside the housing 4 and intended to be manipulated by a user.

The separable electrical contacts 10 are movable between an open state, in which the separable electrical contacts 10 are separated, and a closed state, in which the separable electrical contacts 10 are in contact. In the open state, the separable electrical contacts 10 are, for example, separated from one another by a volume of ambient air acting as an electrical insulator, this preventing an electrical current from flowing. The switching mechanism 12 makes it possible to switch the separable electrical contacts 10 between the open state and the closed state. The switching mechanism 12 is set up to move the electrical contacts 10 to an open state in response to a switching command. The switching command may be sent by a trip ("automatic tripping") or result from an action of a user on the operating lever 14 ("manual tripping").

The protection device 20 also comprises an electronic breaking module which is set up to interrupt an electrical current between the connection terminals 6 and 8. The electronic breaking module, also called a solid-state breaking module, comprises electronic components, notably semiconductor components, such as power transistors. The protection device 20 differs from electromechanical air protection devices which comprise a quenching chamber (arc-extinguishing chamber).

The protection device 20 thus comprises at least one power switch 22 connected in series with the separable electrical contacts 10. Each power switch 22 is switchable between an electrically off state and an electronically on state. In the example illustrated in FIG. 1, the protection device 20 comprises four power switches 22, identified by the references T1, T2, T3 and T4. According to an alternative embodiment of the invention, the protection device 20 may comprise a different number of power switches 22. Thus, the number of power switches 22 may vary according to the topology of the device and notably the number of poles (single-phase, polyphase, with or without a neutral line) but also depending on the current rating of the device. Each power switch 22 may, in practice, be implemented by several components (such as transistors) connected in parallel depending on the rating of the circuit breaker which there is a desire to produce.

The protection device 20 further comprises an electronic control circuit 24 coupled with said at least one power switch 22 (i.e., with each power switch 22). In other words, the electronic control circuit 24 makes it possible to control each of the power switches 22 in order to switch them between the electrically off state and the electronically on state. In many embodiments, the electronic control circuit 24 comprises a processor, such as a programmable microcontroller or a microprocessor. The processor is advantageously coupled to a computer memory, or to any computer-readable data storage medium, which comprises executable instructions and/or software code which is intended to implement a method for detecting an electrical fault when these instructions are executed by the processor. Notably, this method makes it possible to detect an electrical fault such as an overload current, a short circuit, a differential current or the presence of a series (or differential) arc in the line to be protected, but also overvoltages or undervoltages.

The electronic control circuit 24 is set up to switch the power switches 22 to an open state when an electrical fault is detected, for example by a measuring circuit such as the measuring circuit 30.

The protection device 20 comprises a synchronizing system intended to synchronize the switching of the power switches 22 with the opening of the contacts 10, with the aim of avoiding the occurrence of electric arcs when the electrical contacts 10 are being opened and of providing electrical insulation when the protection device 20 is being opened. Thus, during an opening phase of the protection device 20, the electronic control circuit 24 controls the power switches 22 to be switched to their off state before the electrical contacts 10 are separated, this preventing the occurrence of an electric arc and thus allowing the current to be interrupted safely. In contrast, once the electrical contacts 10 are in the open position, the electrical contacts 10 allow an air gap to be created. This prevents an electrical current, such as a leakage current from the power switches 22, or a current resulting from a failure of these power switches 22, from being able to flow anew between the terminals after the protection device 20 has been tripped.

Figure 2:
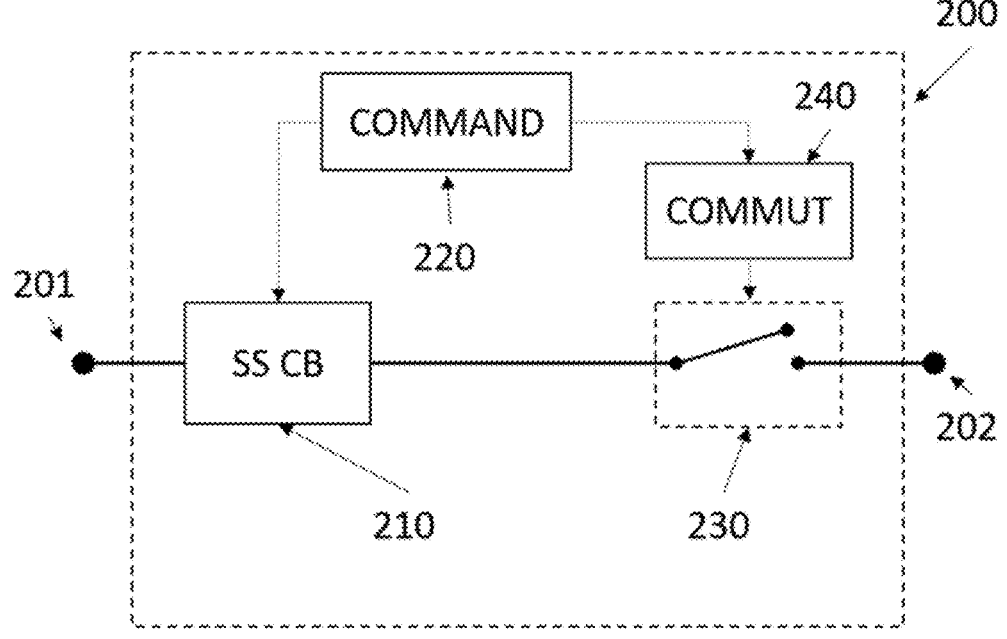
FIG. 2 schematically illustrates the protection device according to the prior art.

FIG. 2 schematically illustrates a protection device 200 known to a person skilled in the art and which is similar to the protection device 20 described above.

The protection device 200 comprises two connection terminals 201 and 202. The two connection terminals 201 and 202 are similar to the connection terminals 6 and 8 of FIG. 1 described above.

The protection device 200 comprises main electrical contacts 230, separable and connected between the two connection terminals 201 and 202, the main electrical contacts 230 being switchable between an open state, in which the electrical contacts are separated to block the passage of a current, and a closed state, in which the electrical contacts are in contact to allow the passage of a current. The main electrical contacts 230 are similar to the separable electrical contacts 10 of FIG. 1 described above.

The protection device 200 comprises a switching mechanism 240, the switching mechanism being adapted to switch the main electrical contacts 230 between the open state and the closed state. The switching mechanism 240 is adapted to switch the main contacts 230 to the open state. The switching mechanism 240 is similar to the switching mechanism 12 of FIG. 1 described above.

The protection device 200 comprises a solid-state power switch 210 connected in series with the main electrical contacts 201 and 202, the power switch being adapted to shift between an open state, blocking the passage of the current, and a closed state, allowing the current to pass through. The power switch 210 is similar to the power switch 22 of FIG. 1 described above.

The protection device 200 comprises a control unit 220, the control unit 220 being adapted to shift the electrical protection device 200 between an open state, in which the power switch 210 and the main electrical contacts 230 are in the open state, and a closed state, in which the power switch 210 and the main electrical contacts 230 are in the closed state. The control unit 220 is adapted to control the power switch 210 and the switching mechanism 240, and to:

when the protection device 200 is being closed, close the main electrical contacts 230 before the power switch 210, and, when the protection device 200 is being opened, open the power switch 210 before opening the main electrical contacts 230.

The control unit 220 is similar to the electronic control circuit 24 of FIG. 1 described above.

Thus, when the protection device 200 is being closed, the main electrical contacts 230 are closed before the power switch 210. That is to say that, in the absence of a fault on the power switch 210, the main electrical contacts 230 are closed while no current is passing through the protection device 200.

Similarly, when the protection device 200 is being opened, the power switch 210 is opened before opening the main electrical contacts 230. That is to say that, in the absence of a fault on the power switch 210, the main electrical contacts 230 are opened while no current is passing through the protection device 200.

In the two preceding cases of closing or opening the protection device 200, and in the absence of a fault of the power switch 210, the main electrical contacts 230 are opened or closed without any risk of an electric arc occurring between the main contacts 230.

Conversely, in the event of a fault of the power switch 210, a fault current may flow through the main contacts 230. This may be problematic when the protection device 200 is being opened because the main contacts 230 are generally not designed to quench an electric arc.

This is a problem that the invention as described hereinbelow proposes to solve.

Figure 3:
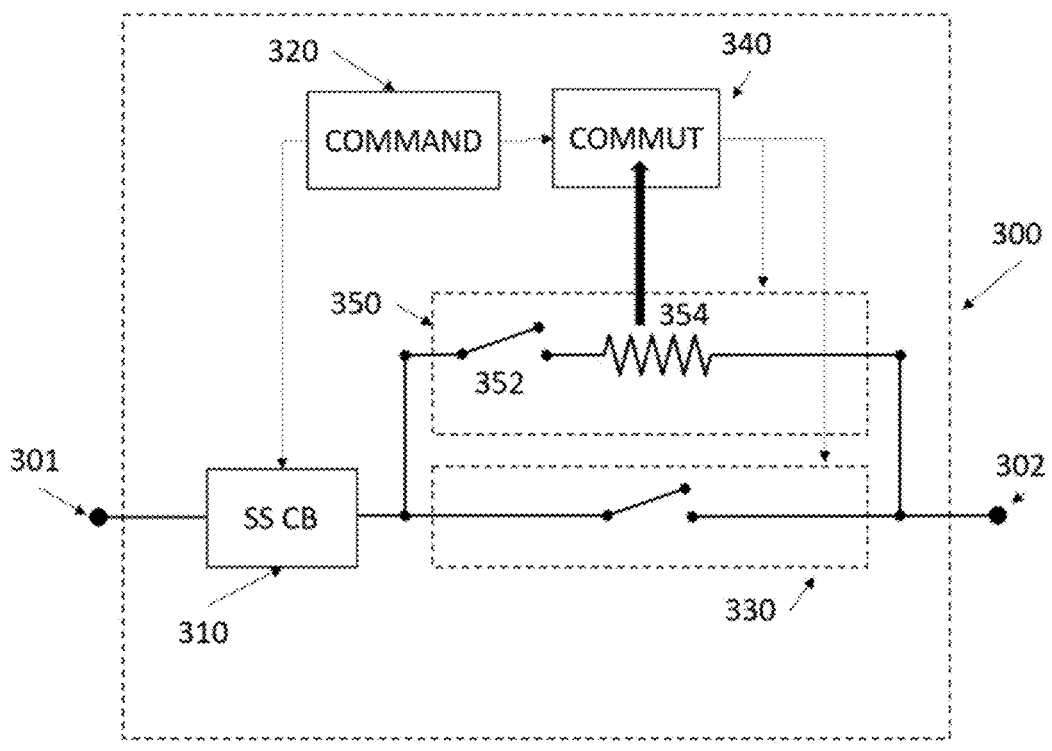
FIG. 3 schematically illustrates the invention according to a first embodiment.

FIG. 3 schematically illustrates the invention according to a first embodiment.

The protection device 300 according to this first embodiment of the invention differs from the protection device 200 in that it comprises a safety device 350.

The principle of the invention is to make sure that the safety device 350 of the protection device 300 is opened last when the protection device 300 is being opened, and closed first when the protection device 300 is being closed. In these two situations, and in the absence of a fault of the power switch 310, no current passes through the safety device 350. Conversely, in the event of a fault of the power switch 310, a fault current then passes through the safety device 350, this making it possible to trip the reopening and/or possibly the blocking in the open position of the protection device 300.

The protection device 300 comprises two connection terminals 301 and 302. The connection terminals 301 and 302 are similar to the connection terminals 6 and 8, and 201 and 202, of FIGS. 1 and 2 described above.

The protection device 300 comprises main electrical contacts 330, separable and connected between the two connection terminals 301 and 302, the main electrical contacts being switchable between an open state, in which the electrical contacts are separated, and a closed state, in which the electrical contacts are in contact. The main electrical contacts 330 are similar to the main electrical contacts 10 and 230 of FIGS. 1 and 2 described above.

The protection device 300 comprises a switching mechanism 340. The switching mechanism is adapted to switch the main electrical contacts 330 from the open state to the closed state and from the closed state to the open state. The switching mechanism 340 is similar to the switching mechanisms 12 and 240 of FIGS. 1 and 2 described above. The switching mechanism 340 is adapted to switch the main electrical contacts 330 from the closed state to the open state after activation by a striker, for example the striker 354 described hereinbelow.

According to one embodiment of the invention, the switching mechanism 340 comprises an operating lever (not shown) similar to the operating lever 14 of the protection device 20 described in document FR3123141. The operating lever may be linked to a mechanical position sensor of said operating lever. This mechanical position sensor is adapted to detect the start of an opening operation of the switching mechanism 340 and then transmit an electrical command to the control unit 320 indicating that a mechanical opening command is in the process of occurring. The whole of the protection device 300 is set up so that the solid-state breaking (i.e. by the power switch 310 described hereinbelow) happens before the actual opening of the main electrical contacts 330 and secondary electrical contacts 352.

The protection device 300 comprises a solid-state power switch 310 connected in series with the main electrical contacts 330, the power switch 310 being adapted to shift between an open state, blocking the passage of the current, and a closed state, allowing the current to pass through. The power switch 310 is similar to the power switches 22 and 210 of FIGS. 1 and 2 described above.

Unlike the protection device 200 described above, the protection device 300 comprises a safety device 350 connected in parallel with the main electrical contacts 330, as illustrated in FIG. 3. The main electrical contacts 330 and the safety device 350 are both placed in series with the power switch 310.

The relationship between the impedance of the main electrical contacts 330 and the impedance of the safety device 350 is set up so that, when the protection device 300 is closed, a nominal current passing through the protection device 300 mainly passes through the main electrical contacts 330 (or "main circuit"), the residual current passing through the safety device 350 being negligible relative to this nominal current. Thus, to this end, the impedance of the safety device 350 is significantly greater than the impedance of the main circuit, the main circuit being the circuit formed by the main electrical contacts 330 in the closed position.

According to one embodiment of the invention, the impedance of the safety device 350 is of an order of magnitude one hundred times greater, preferentially one thousand times greater, even more preferentially more than one thousand times greater, than the impedance of the main circuit. For example, a ratio between the two impedances of the order of one thousand makes it possible to obtain correct functioning of the protection device 300.

The safety device 350 comprises secondary electrical contacts 352, the secondary electrical contacts 352 being separable and movable between an open state, preventing the passage of a current, and a closed state, allowing the passage of a current. The switching mechanism 340 is adapted to switch the secondary electrical contacts 352 to the open state. According to one embodiment, the switching mechanism 340 is adapted to switch the secondary electrical contacts 352 from the open state to the closed state and from the closed state to the open state.

The safety device 350 comprises a control unit 320, the control unit 320 being adapted to shift the electrical protection device 300 between an open state, in which the power switch 310, the main electrical contacts 330 and the secondary electrical contacts 352 are in an open state, blocking the passage of a current through the electrical protection device 300, and a closed state, in which the power switch 310, the main electrical contacts 330 and the secondary electrical contacts 352 are in a closed state, allowing the passage of a current through the electrical protection device 300.

The control unit 320 is adapted to control the power switch 310 and the switching mechanism 340, and to:
  when the electrical protection device 300 is being closed, close the secondary electrical contacts 352 of the safety device 350 before closing the main electrical contacts 330 then the power switch 310, and,
  when the electrical protection device 300 is being opened, open the power switch 310 then the main electrical contacts 330 before opening the secondary electrical contacts 352 of the safety device 350.

The safety device 350 is adapted to, when a current flows through said safety device 350, activate the switching mechanism 340 to switch the main electrical contacts 330 and the secondary electrical contacts 352 to the open state.

According to one embodiment of the invention, the safety device 350 comprises a striker 354 adapted to, when a current flows through said safety device 350, activate the switching mechanism 340 to switch the main electrical contacts 330 and the secondary electrical contacts 352 to the open state. A striker here is a mechanism which, when it is passed through by an electrical current, is adapted to move a mobile element in order to strike a tripping element of the switching mechanism 340. A striker is, for example, an electromagnetic trip, typically comprising an excitation coil coaxially surrounding an insulating, tubular sheath, inside which a mobile ferromagnetic core is mounted such that it can slide. The ferromagnetic core may be moved when a current travels through the excitation coil and thus strike the tripping element of the switching mechanism 340. According to an alternative embodiment of the invention, the striker 354 is a vane actuator. More generally, the striker 354 may be an electromagnetic actuator of another type.

In the case of the protection device 300, when the protection device 300 is being opened, the main electrical contacts 330 and the power switch 310 are opened before opening the secondary electrical contacts 352 of the safety device 350. Thus, in the event of a fault of the power switch 310, the fault current present passes through the single safety device 350. The safety device 350 is then adapted to cut off the fault current.

According to one embodiment of the invention, the secondary electrical contacts 352 are adapted to cut off a possible fault current.

According to one embodiment of the invention, the impedance of the safety device 350 is adapted to reduce the intensity of a possible fault current passing through the safety device 350.

Similarly, when the protection device 300 is being closed, the secondary electrical contacts 352 of the safety device 350 are closed before the main electrical contacts 330 and the power switch 310. Thus, in the event of a fault of the power switch 310, a fault current passes through the safety device 350, the safety device 350 is then adapted to activate the switching mechanism 340 to switch the main electrical contacts 330 and the secondary electrical contacts 352 to the open state. Any attempt to close a protection device 300 comprising a defective power switch 310 is thus prevented.

Figure 4:
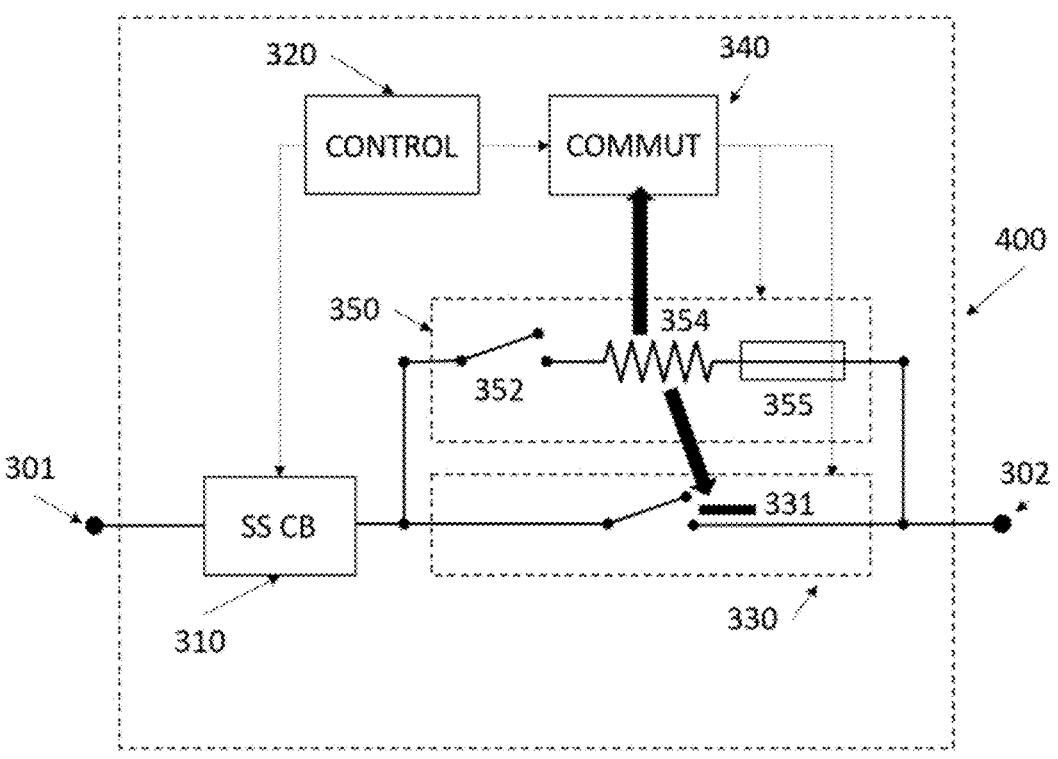
FIG. 4 schematically illustrates the invention according to a second embodiment.

FIG. 4 schematically illustrates the invention according to a second embodiment.

The protection device 400 of FIG. 4 differs from the protection device 300 illustrated in FIG. 3 in that the protection device 400 further comprises a current limiting element 355, connected in series with the secondary electrical contacts 352, and a mobile screen 331.

The mobile screen 331 is made of an electrically insulating material and is adapted to be moved between a first position and a second position, the mobile screen 331 being placed in the first position by default and being placed between the main electrical contacts to prevent contact between the main electrical contacts 330 in the second position.

According to an alternative embodiment of the invention, the protection device 400 comprises, in addition to the first striker 354, a second striker. The second striker is adapted to move the mobile screen 331 into the second position when a current flows through the safety device 350.

According to one embodiment, the mobile screen 331 may pass from the first to the second position, and from the second position to the first position, depending on the position of the second striker.

According to another embodiment, the mobile screen 331 remains in place once it is in the second position, permanently blocking the main electrical contacts.

According to the embodiment illustrated in FIG. 4, the first striker 354 and the second striker are one and the same striker 354, the latter being adapted to both activate the switching mechanism 340 and place the screen 331 in the second position when a fault current travels through it.

Advantageously, in the event of a fault of the power switch 310, the insulating screen 331 is put in place in the second position, physically preventing the main electrical contacts 330 from closing.

Advantageously, the current limiting element 355 makes it possible to increase the arc voltage (in addition to the arc voltage of the secondary contacts 352).

According to one embodiment of the invention, the current limiting element 355 is a polymeric positive temperature coefficient device (PPTC).

Advantageously, when the current limiting element 355 is a fuse, the striker 354 comprises a blocking element in order to possibly allow for the replacement of the damaged component, for example the damaged power switch and/or the fuse.

According to another embodiment of the invention, the current limiting element 355 is a fuse. In this other embodiment, the putting in place of the screen 331 between the main electrical contacts 330 and the melting of the fuse 355 make it possible to guarantee that the protection device 400 is cut off permanently in the event of a fault of the power switch 310.

Figure 5:
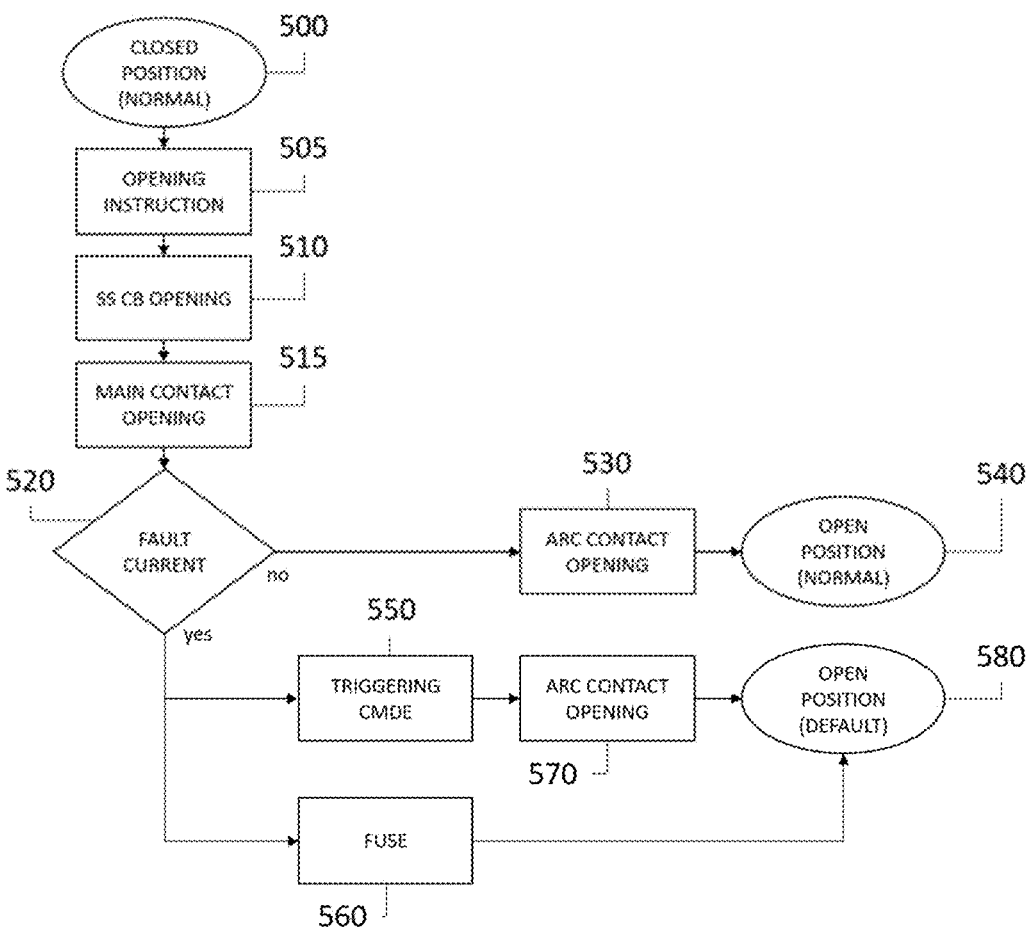
FIG. 5 illustrates a method for making safe the protection device according to one embodiment of the invention, implemented when the protection device is being opened.

FIG. 5 illustrates a method for making safe the protection device 300 or 400 (hereinbelow protection device) as described above according to one embodiment of the invention, implemented when the protection device is being opened.

Step 500 corresponds to the closed state of the protection device. In this closed state, the power switch 310, the main electrical contacts 330 and the secondary electrical contacts 352 are closed; a nominal current may travel through the protection device.

In a step 505, an instruction to open the protection device is received, for example by an action of a user on the operating lever of the switching mechanism 340. This opening instruction may correspond to a manual instruction carried out by a user by way of a control member of the protection device (for example an operating lever linked to the switching mechanism 340) or to automatic tripping instructed by the control unit 320 after the detection of an electrical fault.

According to one embodiment of the invention, during this step 505, the switching mechanism 340 is activated to initiate the switching of the main electrical contacts 330 and secondary electrical contacts 352 to the open state, the switching mechanism 340 being adapted so that the main electrical contacts 330 are only opened in step 515 and the secondary electrical contacts 352 only in step 530. In other words, the switching mechanism 340 is adapted so that the secondary contacts 352 (step 530) are only opened once the main contacts 330 are effectively open (step 515). In other words, the main contacts 330 must be sufficiently open so that there is no occurrence of an electric arc between the main contacts 330 when an arc voltage occurs on the secondary contacts 352 during their opening. There is therefore a predetermined temporal offset between steps 515 and 530, depending, for example, on the opening speed of the main contacts 330. FIGS. 7 to 10 illustrate examples of switching mechanisms making it possible to obtain a temporal offset between the switching of the main electrical contacts 330 and the switching of the secondary electrical contacts 352. In a following step 510, the control unit 320 switches the power switch 310 to the open state.

In a step 515, starting subsequent to or simultaneously with step 510, the control unit 320 switches the main electrical contacts 330 to the open state, possibly via the switching mechanism 340. The faster switching time of the power switch 310 makes it possible to guarantee that step 510 is finished before step 515. In other words, in the absence of a fault of the power switch 310, the main electrical contacts 330 are open without voltage, the power switch 310 having cut off the current beforehand.

Following steps 510 and 515, in a step 520, a fault current may nevertheless be present in the event of a fault of the power switch 310.

In the event that there is no fault current, that is to say that the power switch 310 does not have a fault, in a step 530, the control unit 320 switches the secondary electrical contacts 352 to the open state, possibly via the switching mechanism 340.

In a following step 540, the protection device is then in an open state. In this open state, the power switch 310, the main electrical contacts 330 and the secondary electrical contacts 352 are open; no current may travel through the protection device.

In the event that there is a fault current, that is to say that the power switch 310 has a fault, in a step 550, the safety device 350, being passed through by the fault current, activates the switching mechanism 340 to switch the main electrical contacts 330 and the secondary electrical contacts 352 to the open state. To this end, the safety device 350 may comprise a striker 354 adapted to, when a fault current flows through said safety device 350, activate the switching mechanism 340 to switch the main electrical contacts 330 and the secondary electrical contacts 352 to the open state.

According to one embodiment of the invention, the striker 354 comprises a blocking element adapted to keep the switching mechanism 340 blocked once the striker 354 has been struck. Thus, advantageously, during step 550, the switching mechanism 340 is blocked, preventing any subsequent closing of the protection device 300.

In one embodiment of the invention, the striker 354 does not comprise a blocking element. The activation of the switching mechanism 340 to switch the main electrical contacts 330 and the secondary electrical contacts 352 to the open state is redundant with step 505 of initiating the switching of the main electrical contacts 330 and secondary electrical contacts 352 to the open state. This remains advantageous, however, because this makes it possible to have a simple technical architecture making it possible to protect the protection device 300 and operating just as well during the opening as during the closing of the protection device 300.

In a subsequent step 570, the secondary electrical contacts 352 are opened. According to one embodiment of the invention, the impedance of the safety device 350 reduces the power of the possible electric arc occurring when the secondary electrical contacts 352 are being opened, allowing the fault current to be effectively cut off. This impedance may be adapted by virtue of the presence of a current limiting element 355.

In an optional step 560, present if the protection device comprises a current limiting element 355 of fuse type, said fuse then melts, cutting off the current in the safety device 350.

In addition, and in an optional step that is not shown, and if the safety device comprises a second striker, possibly the same as the striker 354, and a mobile screen 331 as described above, the second striker then moves the mobile screen 331 into the second position, thus preventing a future closing of the main electrical contacts 330.

In a following step 580, the protection device is then in an open state. In this open state, the power switch 310, the main electrical contacts 330 and the secondary electrical contacts 352 are open; no current may travel through the protection device 300.

According to one embodiment of the invention, if the safety device 350 comprises a current limiting element 355, a second striker, possibly the same as the striker 354, and a mobile screen 331 as described above, the protection device 300 may not be put back into its closed state, the safety device 350 being cut off by the melting of the fuse 355 and the main electrical contacts 330 blocked by the screen 331 being put in place in the second position.

According to one embodiment of the invention, the safety device 350 is further adapted to, when a current flows through said safety device 350, and after having activated the switching mechanism 340 to switch the main electrical contacts 330 and the secondary electrical contacts 352 to the open state, block the switching mechanism 340 in order to prevent the main electrical contacts 330 and secondary electrical contacts 352 from being switched to the closed state. According to this embodiment, the switching mechanism 340 is blocked by the striker 354 and may no longer switch the main electrical contacts 330 and the secondary electrical contacts 352 to the closed state.

According to one embodiment of the invention, the striker 354 comprises a blocking element adapted to keep the switching mechanism 340 blocked once the striker is struck.

Figure 6:
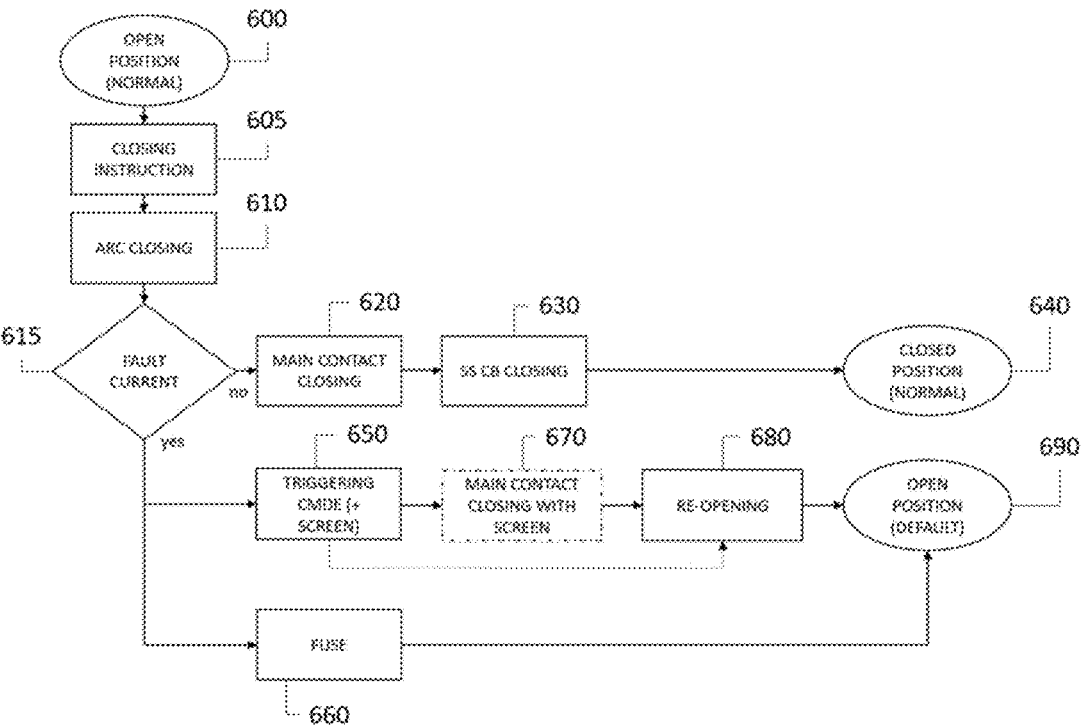
FIG. 6 illustrates a method for making safe the protection device according to one embodiment of the invention, implemented when the protection device is being closed.

FIG. 6 illustrates a method for making safe the protection device 300 or 400 (hereinbelow protection device) as described above, according to one embodiment of the invention, implemented when the protection device is being closed.

Step 600 corresponds to the open state of the protection device. In this open state, the power switch 310, the main electrical contacts 330 and the secondary electrical contacts 352 are open; no current may travel through the protection device.

In a step 605, an instruction to close the protection device is received. This closing instruction may correspond to a manual instruction carried out by a user by way of a control member of the protection device (for example an operating lever linked to the switching mechanism 340) or to automatic closing instructed by the control unit 320.

In a subsequent step 610, the control unit 320, possibly via the switching mechanism 340, switches the secondary electrical contacts 352 to the closed state.

In a step 615, a fault current may occur in the protection device in the event of a fault of the power switch 310.

In the absence of a fault current, in steps 620 and 630, possibly simultaneously, the control unit 320 switches the main electrical contacts 330 and the power switch 310 to the closed state.

In a following step 640, the protection device is then in a closed state. In this closed state, the power switch 310, the main electrical contacts 330 and the secondary electrical contacts 352 are closed; a nominal current may travel through the protection device.

In the presence of a fault current, in a step 650, the safety device 350, being passed through by the fault current, activates the switching mechanism 340 to switch the main electrical contacts 330 and the secondary electrical contacts 352 to the open state.

In an optional step 670, if the safety device comprises a second striker, possibly the same as the striker 354, and a mobile screen 331 as described above, the second striker then moves the mobile screen 331 into the second position, thus physically preventing the main electrical contacts 330 from closing.

In a step 680, the secondary electrical contacts 352 are in the open state.

In an optional step 660, present if the protection device comprises a current limiting element 355 of fuse type, said fuse then melts, cutting off the current in the safety device 350.

According to one embodiment of the invention, if the safety device comprises a current limiting element 355, a second striker, possibly the same as the striker 354, and a mobile screen 331 as described above, the protection device may not be put back into its closed state, the safety device being cut off by the fuse and the main electrical contacts 330 blocked by the screen 331.

According to one embodiment of the invention, the safety device 350 is further adapted to block the switching mechanism 340 in order to prevent the main electrical contacts 330 and secondary electrical contacts 352 from being switched to the closed state. According to this embodiment, the switching mechanism 340 is blocked by the striker 354 and may no longer switch the main electrical contacts 330 and the secondary electrical contacts 352 to the closed state.

According to one embodiment of the invention, the striker 354 comprises a blocking element adapted to keep the switching mechanism 340 blocked once the striker 354 is struck.

In a following step 690, the protection device is then in an open state. In this open state, the power switch 310, the main electrical contacts 330 and the secondary electrical contacts 352 are open; no current may travel through the protection device.

FIGS. 7, 8, 9 and 10 schematically illustrate architectures for implementing the invention according to various embodiments. In these various embodiments, the switching mechanism 340 makes it possible to mechanically manage temporal offset kinematics between the switching of the main electrical contacts 330 and the secondary electrical contacts 352. These temporal offset kinematics are adapted to:

when the switching mechanism 340 is activated to open the protection device 300, allow the main electrical contacts 330 to be opened before the secondary electrical contacts 352, and, when the switching mechanism 340 is activated to close the protection device 300, allow the secondary electrical contacts to be closed before the main electrical contacts 330.

Figures 7, 7A, 7B, 7C:
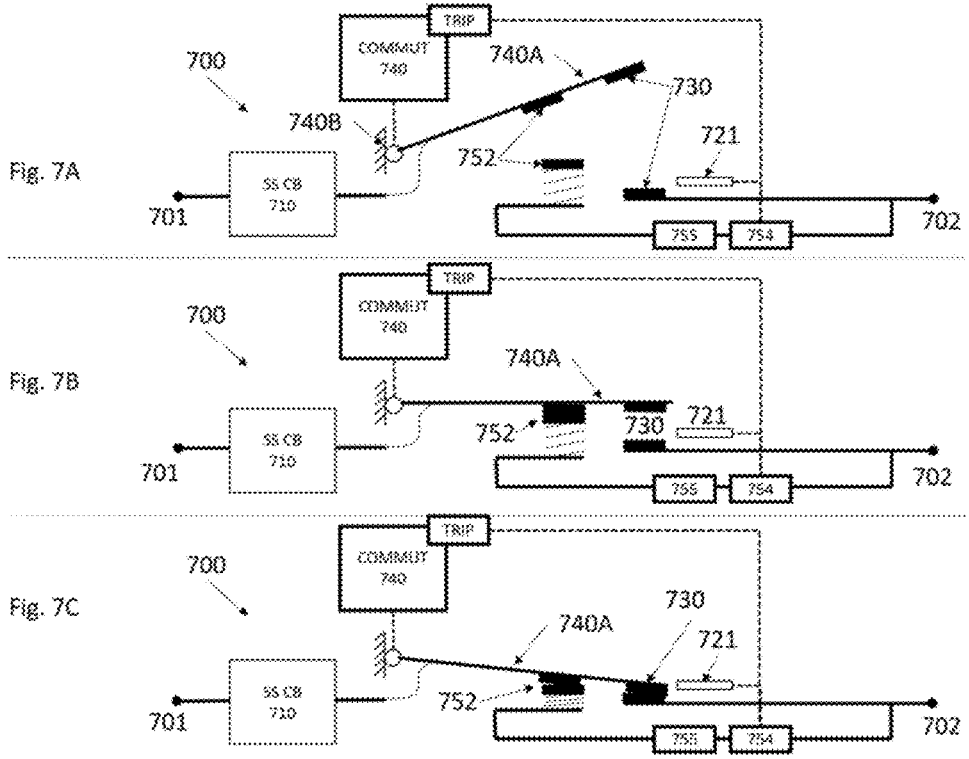
FIG. 7 schematically illustrates an architecture for implementing the invention according to a first embodiment, making it possible to manage the offset kinematics between the main contact and the arc contact.

FIG. 7 schematically illustrates an architecture for implementing the invention according to a first embodiment.

FIG. 7 comprises the three FIGS. 7A, 7B and 7C, illustrating the same architecture for implementing the invention in a protection device 700 according to the first embodiment. Each FIGS. 7A, 7B and 7C illustrates the protection device 700 and corresponds to a different position of a contact element 740A (hereinbelow the element 740A) comprised in a switching mechanism 740 similar to the switching mechanism 340 described above.

The protection device 700 comprises two connection terminals 701 and 702. The connection terminals 701 and 702 are similar to the connection terminals 301 and 302 of FIG. 3 described above.

The protection device 700 comprises a power switch 710 similar to the power switch 310 of the protection device 300 described above.

The protection device 700 comprises main electrical contacts 730. The main electrical contacts 730 are switchable between an open state, in which the electrical contacts are separated, and a closed state, in which the electrical contacts are in contact. The main electrical contacts 730 are similar to the main electrical contacts 330 of FIG. 3 described above.

The protection device 700 comprises secondary electrical contacts 752. The secondary electrical contacts 752 are switchable between an open state, in which the electrical contacts are separated, and a closed state, in which the electrical contacts are in contact. The secondary electrical contacts 752 are similar to the main electrical contacts 352 of FIG. 3 described above.

The protection device 700 comprises a switching mechanism 740 (referenced "COMMUT" in FIG. 7). The switching mechanism 740 is adapted to switch the main electrical contacts 730 and the secondary electrical contacts 752 from the open state to the closed state and from the closed state to the open state. The switching mechanism 740 is similar to the switching mechanism 340 of FIG. 3 described above.

In this first embodiment of the invention, the switching mechanism 740 comprises the contact element 740A, this contact element 740A comprising an upper part of the main contacts 730 and an upper part of the secondary contacts 752. The element 740A is made of an electrically conductive material and allows electrical continuity between the connection terminals 701 and 702 when the upper part of the main contacts 730 or the upper part of the secondary contacts 752 is in contact with the lower part of the respective contacts.

The element 740A is rotatably mounted on a pin 740B, the switching mechanism 740 being adapted to make the element 740A pivot about this pin 740B between a high position, illustrated in FIG. 7A, and a low position, illustrated in FIG. 7C. The high position corresponds to the open position of the protection device 700. The low position corresponds to the closed position of the protection device 700.

The protection device 700 is adapted so that, when the element 740A passes from its high position to its low position, and vice versa, the element 740A passes through an intermediate position illustrated in FIG. 7B. In this intermediate position, the secondary contacts 752 are closed while the main contacts 730 are open. To this end, as illustrated in FIG. 7, the lower part of the secondary contacts 752 may be elevated with respect to the lower part of the main contacts 730, it being possible for the lower part of the secondary contacts 752 to be mounted on a spring, for example. Because of this, when the element 740A passes from the high position to the low position, the element 740A first comes into contact with the lower part of the secondary contacts 752, then, for example owing to the elasticity of the spring on which the lower part of the secondary contacts 752 is mounted, the element 740A may continue to descend to reach its low position illustrated in FIG. 7C in which the main contacts 730 and the secondary contacts 752 are both closed. This offset arrangement of the contacts makes it possible to introduce a temporal offset between the main and secondary contacts during the contacting (closing) and during the opening of the protection device 700 in accordance with the closing and opening methods described above and illustrated in FIGS. 5 and 6.

The protection device 700 comprises a striker 754 similar to the striker 354 of the protection device 300 described above. This striker, when it is passed through by a fault current, may activate a trip (referenced "TRIP") of the switching mechanism 740, thus tripping the pivoting of the element 740A upward, by rotation about the pin 740B, first opening the main contacts 730 (intermediate position illustrated in FIG. 7B) then the secondary contacts 752 (open position illustrated in FIG. 7A).

In other words, the protection device 700 comprises a safety device similar to the safety device 350 of the protection device 300 described above. The safety device of the protection device 700 comprises the secondary contacts 752, the striker 754, adapted to be able to trip the switching mechanism 740 and to be able to put the screen 721 in place, and the current limiting element 755.

In the embodiment illustrated in FIG. 7, the striker 754 is adapted to be able to trip the switching device 740 and put the screen 721 in place when a fault current of greater than a predetermined value flows through the protection device.

The protection device 700 may comprise a screen 721 similar to the screen 321 of the protection device 300 described above. In the embodiment illustrated in FIG. 7, the screen 721 is adapted to be able to be pushed by the striker 752 towards the left of the figure, so as to end up interposed between the lower part and the upper part (on the element 740A) of the main contacts 730, effectively preventing the possible closing of the main contacts 730.

The protection device 700 may comprise a current limiting element 755 similar to the element 355 of the protection device 300 described above.

The protection device 700 is adapted to implement the safety method implemented during the opening of a protection device described above and illustrated in FIG. 5.

The protection device 700 is adapted to implement the safety method implemented during the closing of a protection device described above and illustrated in FIG. 6.

Figure 8:
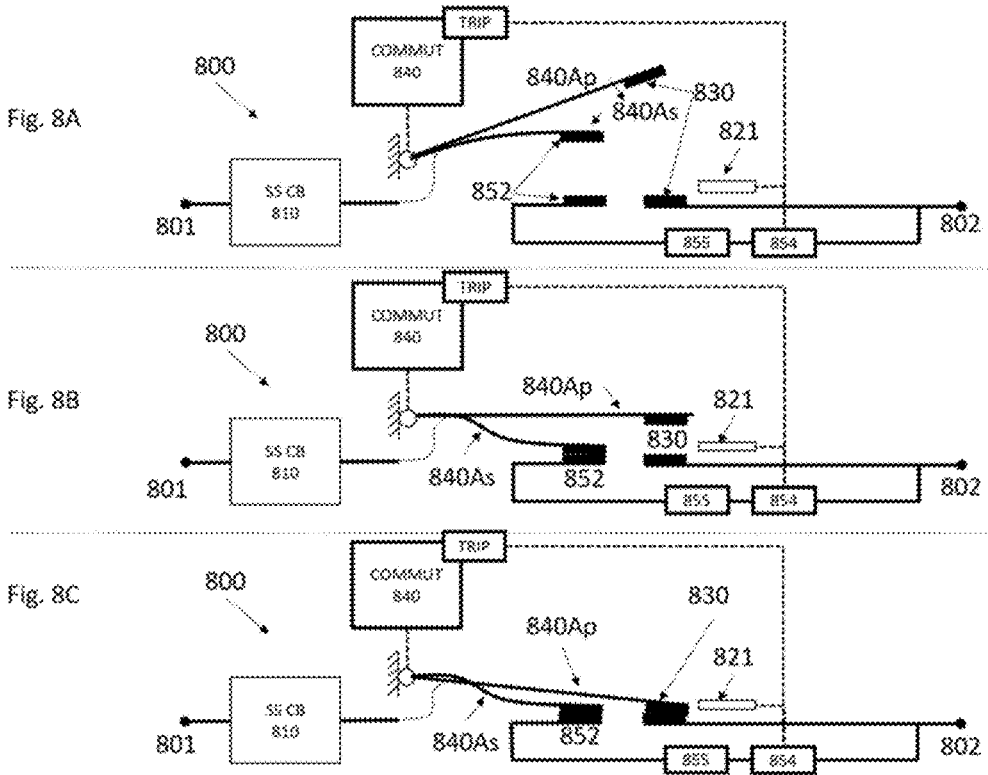
FIG. 8 schematically illustrates an architecture for implementing the invention according to a second embodiment, making it possible to manage the offset kinematics between the main contact and the arc contact.

FIG. 8 schematically illustrates an architecture for implementing the invention according to a second embodiment, making it possible to manage the offset kinematics between the main contact and the arc contact.

FIG. 8 comprises the three FIGS. 8A, 8B and 8C, illustrating the same architecture for implementing the invention in a protection device 800 according to the second embodiment. Each FIGS. 8A, 8B and 8C illustrates the protection device 800 and corresponds to a different position of a contact element 840A (hereinbelow the element 840A) comprised in a switching mechanism 840 similar to the switching mechanism 340 described above.

The protection device 800 corresponds to an alternative embodiment of the protection device 700 described hereinabove and differs from the latter in that it does not comprise a spring supporting the lower part of the secondary contacts 752 and making it possible to produce a temporal offset, during the lowering or raising movement of the element 740A, between the openings and closings of the main and secondary contacts.

The protection device 800 comprises an element 840A, substantially similar to the element 740A, comprising two sub-elements 840Ap and 840As. The sub-element 840Ap comprises an upper part of the main contacts 830. The sub-element 840As comprises an upper part of the secondary contacts 852 and is flexible. The sub-element 840As is, for example, a spring blade. The mechanical offset between the position of the two sub-elements 840Ap and 840As in the open position (illustrated in FIG. 8A), the sub-element 840As then being beneath the sub-element 840Ap, and the elasticity of the element 840As, make it possible to produce the temporal offset described above in the methods illustrated in FIGS. 5 and 6 during the closing of the secondary contacts 852 and main contacts 830.

The protection device 800 is adapted to implement the safety method implemented during the opening of a protection device described above and illustrated in FIG. 5.

The protection device 800 is adapted to implement the safety method implemented during the closing of a protection device described above and illustrated in FIG. 6.

Figure 9:
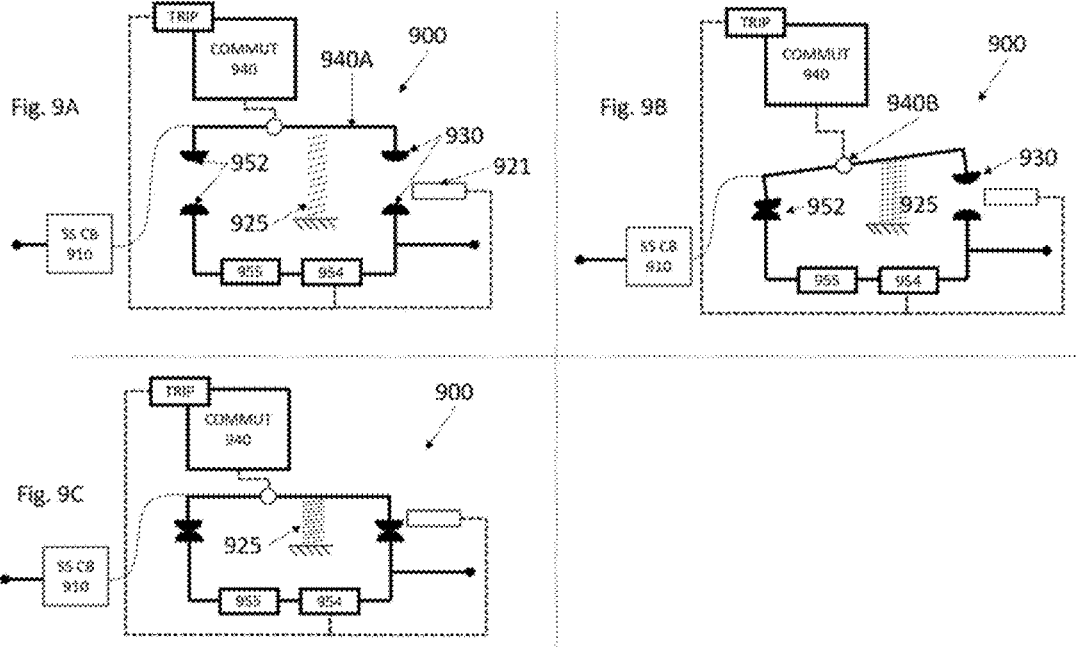
FIG. 9 schematically illustrates an architecture for implementing the invention according to a third embodiment, making it possible to manage the offset kinematics between the main contact and the arc contact.

FIG. 9 schematically illustrates an architecture for implementing the invention according to a third embodiment, making it possible to manage the offset kinematics between the main contact and the arc contact.

FIG. 9 comprises the three FIGS. 9A, 9B and 9C, illustrating the same architecture for implementing the invention in a protection device 900 according to the third embodiment. Each FIGS. 9A, 9B and 9C illustrates the protection device 900 and corresponds to a different position of a contact element 940A (hereinbelow the element 940A) comprised in a switching mechanism 940 similar to the switching mechanism 340 described above.

In this alternative embodiment, the temporal offset, during the lowering or raising movement of the element 940A, between the openings and closings of the main contacts 930 and secondary contacts 952, is obtained by a cantilever between a point 940B for guiding the element 940A by the switching mechanism 940 and an elastic pivot means, for example a spring 925.

The protection device 900 comprises a striker 954 similar to the striker 354. The striker 954 is adapted to trip the switching device 940, and possibly put the screen 921 in place, when a fault current of greater than a predetermined value flows through the protection device 900.

The protection device 900, as for the other embodiments, may comprise a current limiting element 955, possibly a fuse, and/or a screen 921, similar to the current limiting element 355 and to the screen 321, respectively.

The protection device 900 is adapted to implement the safety method implemented during the opening of a protection device described above and illustrated in FIG. 5.

The protection device 900 is adapted to implement the safety method implemented during the closing of a protection device described above and illustrated in FIG. 6.

Figure 10:
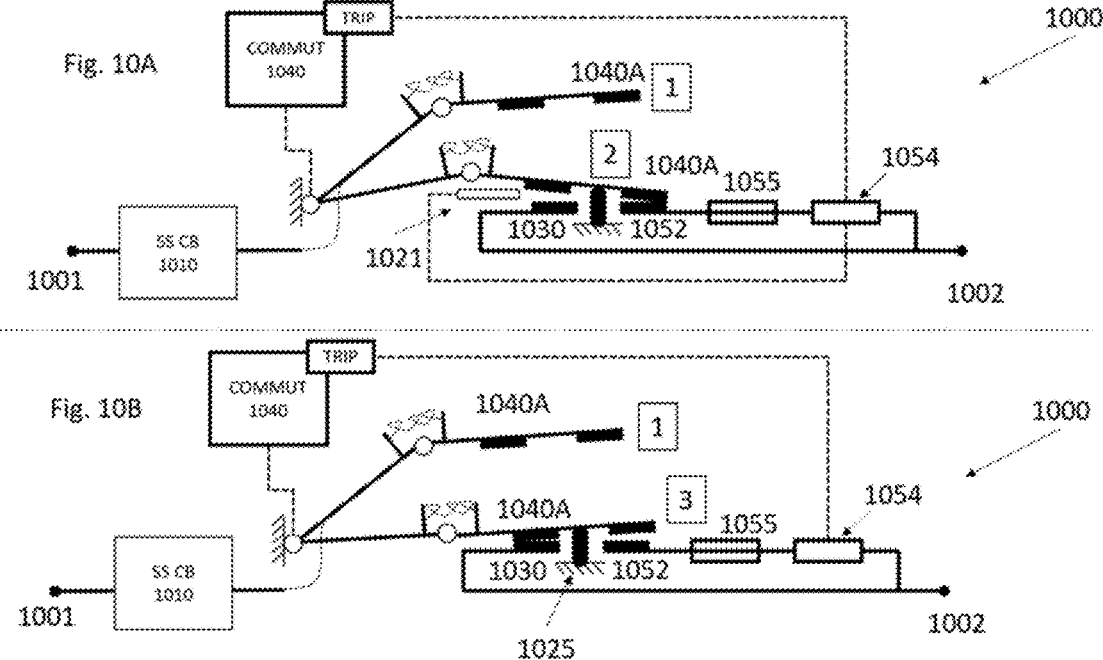
FIG. 10 schematically illustrates an architecture for implementing the invention according to a fourth embodiment, making it possible to manage the offset kinematics between the main contact and the arc contact.

FIG. 10 schematically illustrates an architecture for implementing the invention according to a fourth embodiment, making it possible to manage the offset kinematics between the main contact and the arc contact.

FIG. 10 comprises FIGS. 10A and 10B, illustrating the same architecture of a protection device 1000 in three different positions (positions 1, 2 and 3, the three references corresponding to these three positions being boxed in FIGS. 10A and 10B) of a contact element 1040A (hereinbelow the element 1040A) comprised in a switching mechanism 1040 (the open position 1 being illustrated in the two FIGS. 10A and 10B). The switching mechanism 1040 comprises the contact element 1040A, the element 1040A being shown individually in FIGS. 10A and 10B to explain its operation.

FIGS. 10A and 10B illustrate connection terminals 1001 and 1002 similar to the connection terminals 301 and 302, and a power switch 1010 similar to the power switch 310 (referenced "SS CB" for "Solid-State Circuit Breaker"). A striker 1052 is illustrated, the dashed lines illustrating that the activation of this striker 1052 is adapted to trip the switching mechanism 1040 (illustrated in FIGS. 10A and 10B by the reference "TRIP") and, possibly, to put in place a mobile screen 1021 similar to the mobile screen 321 (mobile screen 1021 not shown in FIG. 10B by simplification). A current limiting element 1055, possibly a fuse, is also illustrated. This current limiting element 1055 is similar to the current limiting element 355.

Main electrical contacts 1030 and secondary electrical contacts 1052 are illustrated. The main electrical contacts 1030 are similar to the main electrical contacts 330. The secondary electrical contacts 1052 are similar to the secondary electrical contacts 352. As illustrated, a part of each of the main and secondary electrical contacts is comprised on the same element 1040A.

The element 1040A is an electrical conductor. The element 1040A comprises two articulated rods, an element of spring type maintaining a bent shape to the element 1040A in order that, when the element 1040A is lowered, as illustrated in position 2, the end of the element 1040A, comprising a part of the secondary electrical contacts 1052, enters into contact first with the fixed part of the secondary electrical contacts 1052.

A fixed stop 1025 is adapted so that the lowering of the element 1040A causes a tipping effect on the end of the element 1040A, the contact between the secondary electrical contacts 1052 being broken, and the main electrical contacts 1030 being closed, as illustrated by position 3 of FIG. 10B.

Advantageously, in this embodiment illustrated in FIG. 10, the main electrical contacts 1030 and the secondary electrical contacts 1052 are not in the closed position at the same time.

When the protection device 1000 is being closed, and in a similar way to the method illustrated in FIG. 6, the secondary electrical contacts 1052 are thus properly closed (step 610) before the main electrical contacts 1030 are (step 620). If a fault current is present, this activates the striker 1054 and causes the tripping of the switching mechanism 1040, the element 1040A being raised, which opens the protection device. In this case, the element 1040A is possibly raised before even having been able to enter into contact with the main electrical contacts 1030.

When the protection device 1000 is being opened, and in a similar way to the method illustrated in FIG. 5, the secondary electrical contacts 1052 are thus properly opened (step 530; corresponding to the passage of the element 1040A from position 2 to position 1) after the main electrical contacts 1030 are (step 515, corresponding to the start of the passage of the element 1040A from position 3 to position 2). A particular feature of the embodiment illustrated in FIG. 10 is that an intermediate step of closing the secondary electrical contacts 1052 is carried out immediately after the opening of the main electrical contacts 1030 by the tipping of the end of the element 1040A about the stop 1025 when the element 1040A is raised (end of the passage from position 3 to position 2 of the element 1040A).

Figure 11:
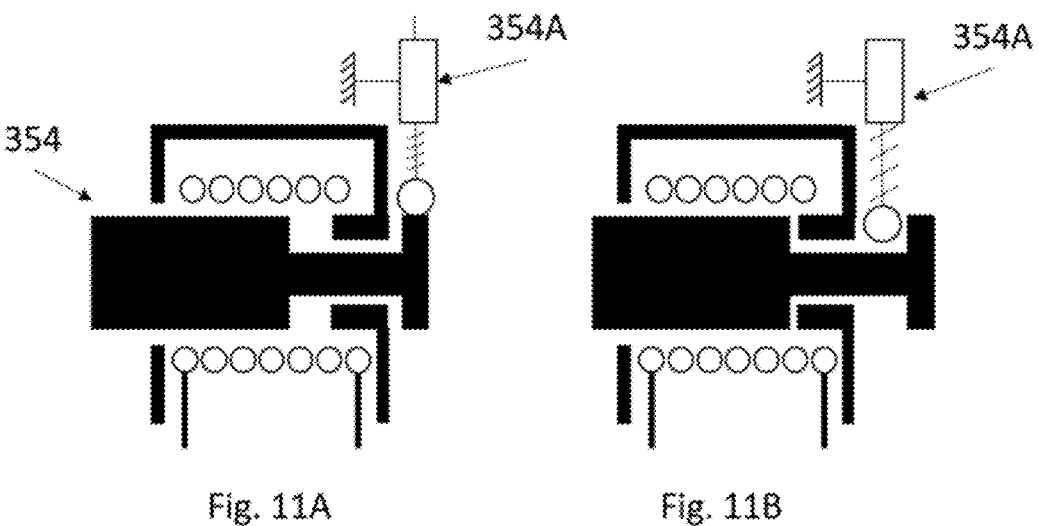
FIG. 11 schematically illustrates an architecture of an actuator comprising a blocking element in its activated position according to a first embodiment.

FIG. 11 schematically illustrates an architecture of a striker comprising a blocking element in its activated position according to a first embodiment.

The illustrated striker corresponds to the striker 354 described above. FIG. 11A illustrates the striker 354 in a non-activated position, called rest position. FIG. 11B illustrates the striker 354 in an activated position. The striker 354 here comprises a blocking element 354A preventing any return to the rest position illustrated in FIG. 11A of the striker after the striker 354 has passed into its activated position illustrated in FIG. 11B. The striker 354 is thus kept in its struck position (FIG. 11B) and is adapted to thus keep a switching mechanism, such as the switching mechanism 340 described above, tripped (or activated). The switching mechanism 340 is thus kept blocked once the striker 354 has been activated, preventing the protection device 300 from being switched to the closed state. In other words, once the striker 354 has been activated, the latter maintains an action on the tripping mechanism (referenced "TRIP" in the preceding figures) of the switching mechanism, keeping said switching mechanism in its open position. The blocking element 354A makes the passage of the striker 354 from its rest position (FIG. 11A) to its activated position (FIG. 11B) irreversible.

Figure 12:
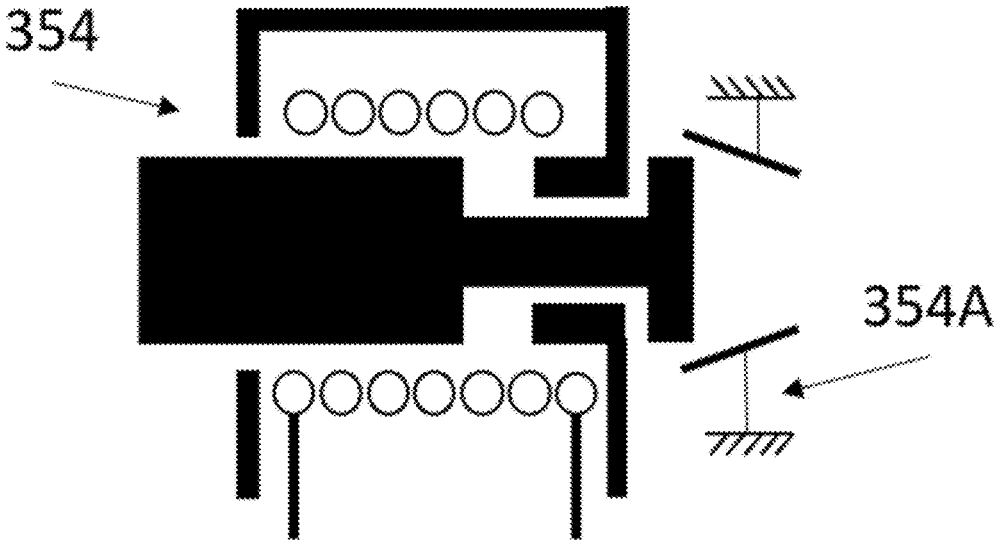
FIG. 12 schematically illustrates an architecture of an actuator comprising a blocking element in its activated position according to a second embodiment.

FIG. 12 schematically illustrates an architecture of a striker comprising a blocking element in its activated position according to a second embodiment.

FIG. 12 illustrates an alternative embodiment of the blocking element 354A. In this embodiment of the invention, the blocking element 354A takes a conical shape, allowing the passage of the striker in one direction but preventing its return to the rest position.

Figure 13:
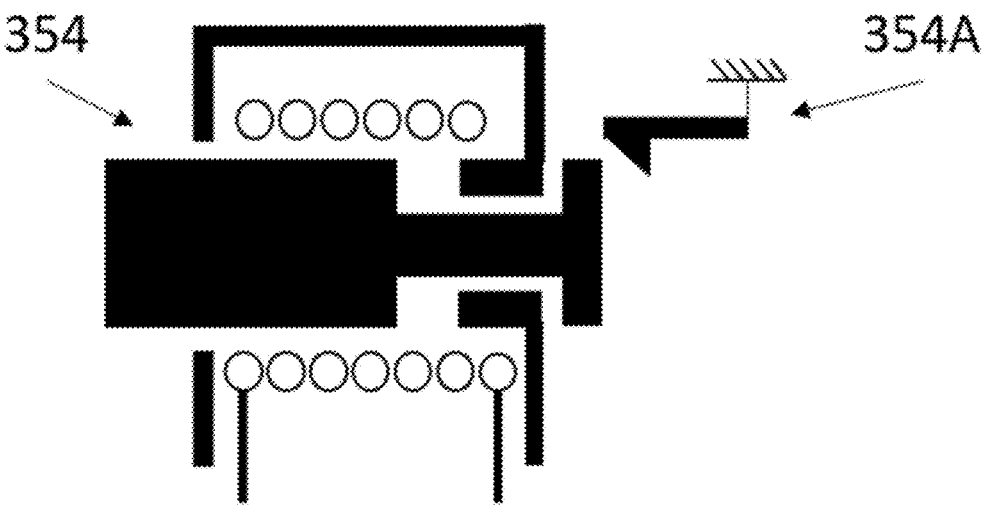
FIG. 13 schematically illustrates an architecture of an actuator comprising a blocking element in its activated position according to a third embodiment.

FIG. 13 schematically illustrates an architecture of a striker comprising a blocking element in its activated position according to a third embodiment.

FIG. 13 illustrates an alternative embodiment of the blocking element 354A. In this embodiment of the invention, the blocking element 354A takes a shape of a flexible tab, making it possible to retain the striker in its activated position, preventing its return to the rest position.

Figure 14:
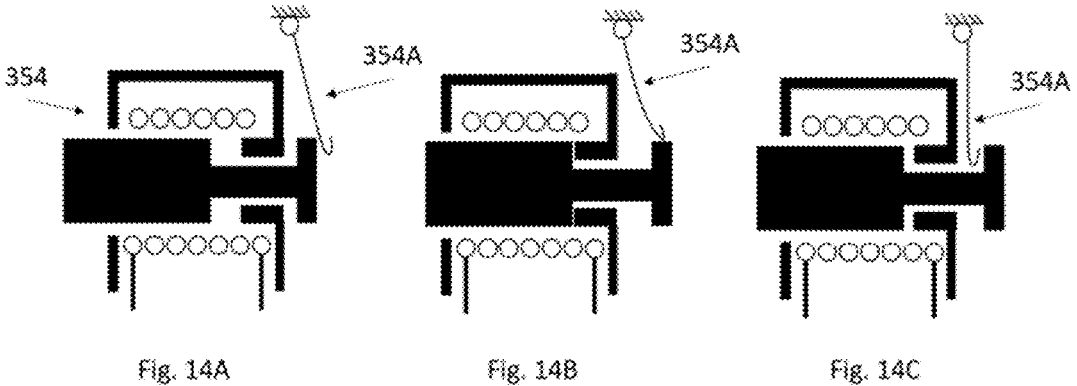
FIG. 14 schematically illustrates an architecture of an actuator comprising a blocking element in its activated position according to a fourth embodiment.

FIG. 14 schematically illustrates an architecture of a striker comprising a blocking element in its activated position according to a fourth embodiment.

FIG. 14 illustrates an alternative embodiment of the blocking element 354A. In this embodiment of the invention, the blocking element 354A takes a shape of a flexible rod comprising a thickness at its end, making it possible to retain the striker in its activated position (position illustrated in FIG. 14C), preventing its return to the rest position (position illustrated in FIG. 14A). The flexibility of the blocking element 354A allows the striker to be activated (illustration of the flexibility of the rod of the blocking element 354A in FIG. 14B, corresponding to the passage from the rest position to the activated position) but then the end of the flexible rod comes to prevent the return to the rest position. The flexibility of the spring blade advantageously makes it possible to keep the striker in the rest and retracted position.

Figure 15:
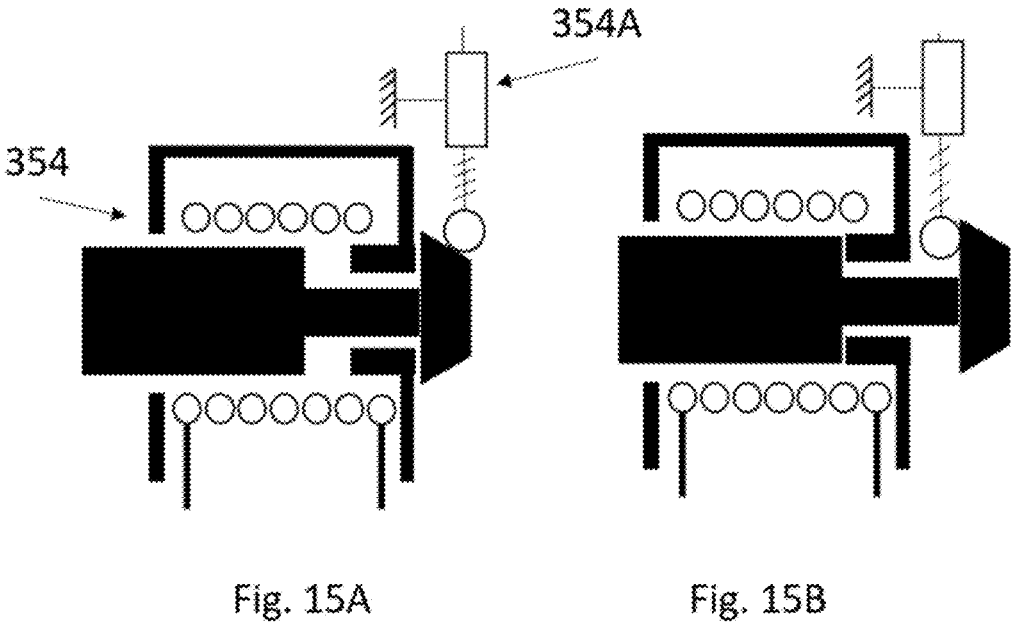
FIG. 15 schematically illustrates an architecture of an actuator comprising a blocking element in its activated position according to a fifth embodiment.

FIG. 15 schematically illustrates an architecture of an actuator comprising a blocking element in its activated position according to a fifth embodiment.

FIG. 15 illustrates a striker similar to the striker 354 and comprising a blocking element 354A. The illustrated striker corresponds to an alternative embodiment to the striker illustrated in FIG. 11. The conical shape of the end of the striker makes it possible to keep the striker in the retracted position at rest due to the fact that the force of the spring of the blocking element 354A is converted into force to keep said striker in the retracted position by the contact of the end of the blocking element 354A on the conical shape. This principle advantageously replaces a spring normally present in the striker to maintain the rest position of the striker.

The invention claimed is:

1. An electrical protection device comprising:

two connection terminals, main electrical contacts, separable and connected between the two connection terminals, the main electrical contacts being switchable between an open state, in which the electrical contacts are separated, and a closed state, in which the electrical contacts are in contact, a switching mechanism, the switching mechanism being adapted to switch the main electrical contacts to the open state, a solid-state power switch connected in series with the main electrical contacts, the power switch being adapted to shift between an open state, blocking a passage of current, and a closed state, allowing the current to pass through, a safety device connected in parallel with the main electrical contacts, the safety device comprising:

secondary electrical contacts, the secondary electrical contacts being separable and movable between an open state and a closed state, the switching mechanism being adapted to switch the secondary electrical contacts to the open state, and a control unit, the control unit being adapted to shift the electrical protection device between an open state, in which the power switch, the main electrical contacts and the secondary electrical contacts are in an open state, and a closed state, in which the power switch, the main electrical contacts and the secondary electrical contacts are in a closed state, the control unit being adapted to control the power switch and the switching mechanism, and to:

when the electrical protection device is being closed, close the secondary electrical contacts of the safety device before the main electrical contacts and the power switch, and when the electrical protection device is being opened, open the main electrical contacts and the power switch before opening the secondary electrical contacts of the safety device, and the safety device being adapted to, when a current of greater than a predetermined value flows through said safety device:

activate the switching mechanism to switch the main electrical contacts and the secondary electrical contacts to the open state.

2. The electrical protection device of claim 1, the safety device comprising a first striker adapted to, when the current of greater than the predetermined value flows through said safety device, activate the switching mechanism to switch the main electrical contacts and the secondary electrical contacts to the open state.

3. The electrical protection device of claim 1, the switching mechanism being adapted to switch the separable main electrical contacts and the separable secondary electrical contacts to the open state and to the closed state, the safety device being further adapted to, when the current of greater than the predetermined value flows through said safety device, and after having activated the switching mechanism to switch the separable main electrical contacts and the separable secondary electrical contacts to the open state:

block the switching mechanism to prevent the main electrical contacts and the secondary electrical contacts from switching to the closed state.

4. The electrical protection device of claim 2, the switching mechanism being adapted to switch the separable main electrical contacts and the separable secondary electrical contacts to the open state and to the closed state, the safety device being further adapted to, when the current of greater than the predetermined value flows through said safety device, and after having activated the switching mechanism to switch the separable main electrical contacts and the separable secondary electrical contacts to the open state:

block the switching mechanism to prevent the main electrical contacts and the secondary electrical contacts from switching to the closed state, and the first striker comprising a blocking element adapted to keep the switching mechanism blocked once the striker is struck.

5. The electrical protection device of claim 1, the safety device further comprising a current limiting element connected in series with the secondary electrical contacts.

6. The electrical protection device of claim 5, the current limiting element connected in series with the secondary electrical contacts being a fuse.

7. The electrical protection device of claim 1, the safety device further comprising a mobile screen, the mobile screen being made of an electrically insulating material and adapted to be moved between a first position and a second position, the mobile screen being placed in the first position by default and being placed between the main electrical contacts to prevent contact between the main electrical contacts in the second position, the safety device comprising a second striker, the second striker being adapted to, when the current of greater than the predetermined value flows through said safety device:

move the mobile screen into the second position.

8. The electrical protection device of claim 4, the safety device further comprising a mobile screen, the mobile screen being made of an electrically insulating material and adapted to be moved between a first position and a second position, the mobile screen being placed in the first position by default and being placed between the main electrical contacts to prevent contact between the main electrical contacts in the second position, the safety device comprising a second striker, the second striker being adapted to, when the current of greater than the predetermined value flows through said safety device:

move the mobile screen into the second position, and the first striker and the second striker being one and the same striker.

* * * * *